(12) United States Patent
Ishimura et al.

(10) Patent No.: US 6,693,905 B1
(45) Date of Patent: Feb. 17, 2004

(54) DATA EXCHANGE UNIT

(75) Inventors: Isamu Ishimura, Kyoto (JP); Hiroshi Yoshida, Osaka (JP); Yoshihiro Tabira, Osaka (JP); Hirotaka Ito, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/541,726

(22) Filed: Apr. 3, 2000

(30) Foreign Application Priority Data

Apr. 9, 1999 (JP) ............................................. 11-102274
Apr. 9, 1999 (JP) ............................................. 11-102275

(51) Int. Cl.[7] ............................................... H04L 12/56
(52) U.S. Cl. .................. 370/389; 370/412; 711/170; 711/173
(58) Field of Search .................... 370/389, 411, 370/412, 428; 710/29, 32, 52, 72; 711/170, 101, 147, 148, 153, 173; 709/232, 238

(56) References Cited

U.S. PATENT DOCUMENTS

| | | | |
|---|---|---|---|
| 5,546,377 A | * | 8/1996 | Ozveren ...................... 370/253 |
| 5,632,016 A | * | 5/1997 | Hoch et al. .................... 710/30 |
| 5,659,777 A | * | 8/1997 | Iwasaki et al. ............... 709/226 |
| 5,809,335 A | | 9/1998 | Kamiya ........................ 710/22 |
| 5,856,975 A | | 1/1999 | Rostoker et al. ........ 370/395.64 |
| 6,310,884 B1 | * | 10/2001 | Odenwald, Jr. .............. 370/412 |

OTHER PUBLICATIONS

"LINK (IEEE 1394) MD8413 Users Manual", FUJIFILM Microdevices Co., Ltd., pp. 73–83 (1996).

* cited by examiner

Primary Examiner—Alpus H. Hsu
Assistant Examiner—Michael J. Molinari
(74) Attorney, Agent, or Firm—Nixon Peabody, LLP

(57) ABSTRACT

A reception buffer, a transmission buffer, a transmission-reception buffer, a reception filter, a transmission filter and a packet processor are provided. If a response packet paired with a request packet has been received during a data exchange operation, then the reception filter stores the response packet received on the transmission-reception buffer and informs the packet processor of response detected. Alternatively, if a packet that has nothing to do with the current data exchange operation has been received, then the reception filter stores the received packet on the reception buffer and issues a suspension instruction to the packet processor. And when a transaction being carried out at the time of reception is completed, the packet processor suspends the data exchange. In this manner, the overheads involved with firmware processing by a central processing unit can be reduced and data can be exchanged at higher speeds.

4 Claims, 14 Drawing Sheets

BWRQ packet
(write request for data block packet)

QWRQ packet
(write request for data quadlet packet)

WRS packet
(write response packet)

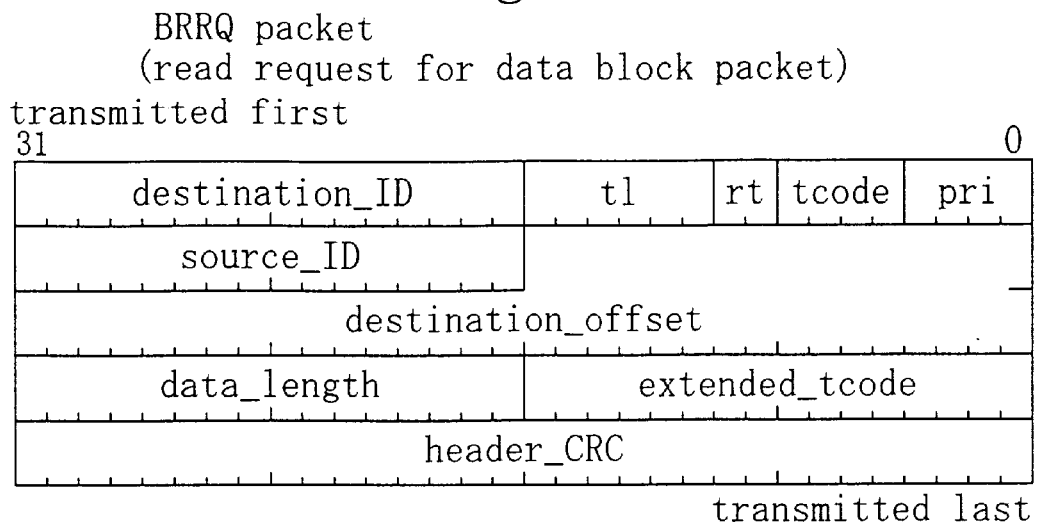
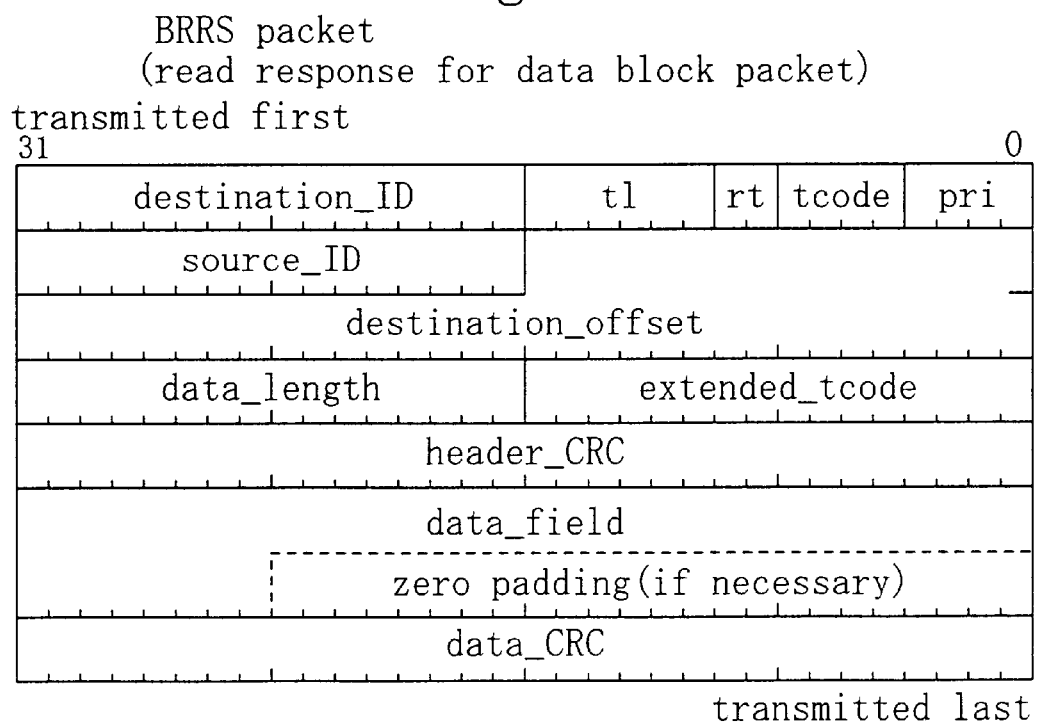

internal BWRQ packet internal QWRQ packet internal WRS packet internal BRRQ packet internal BRRS packet

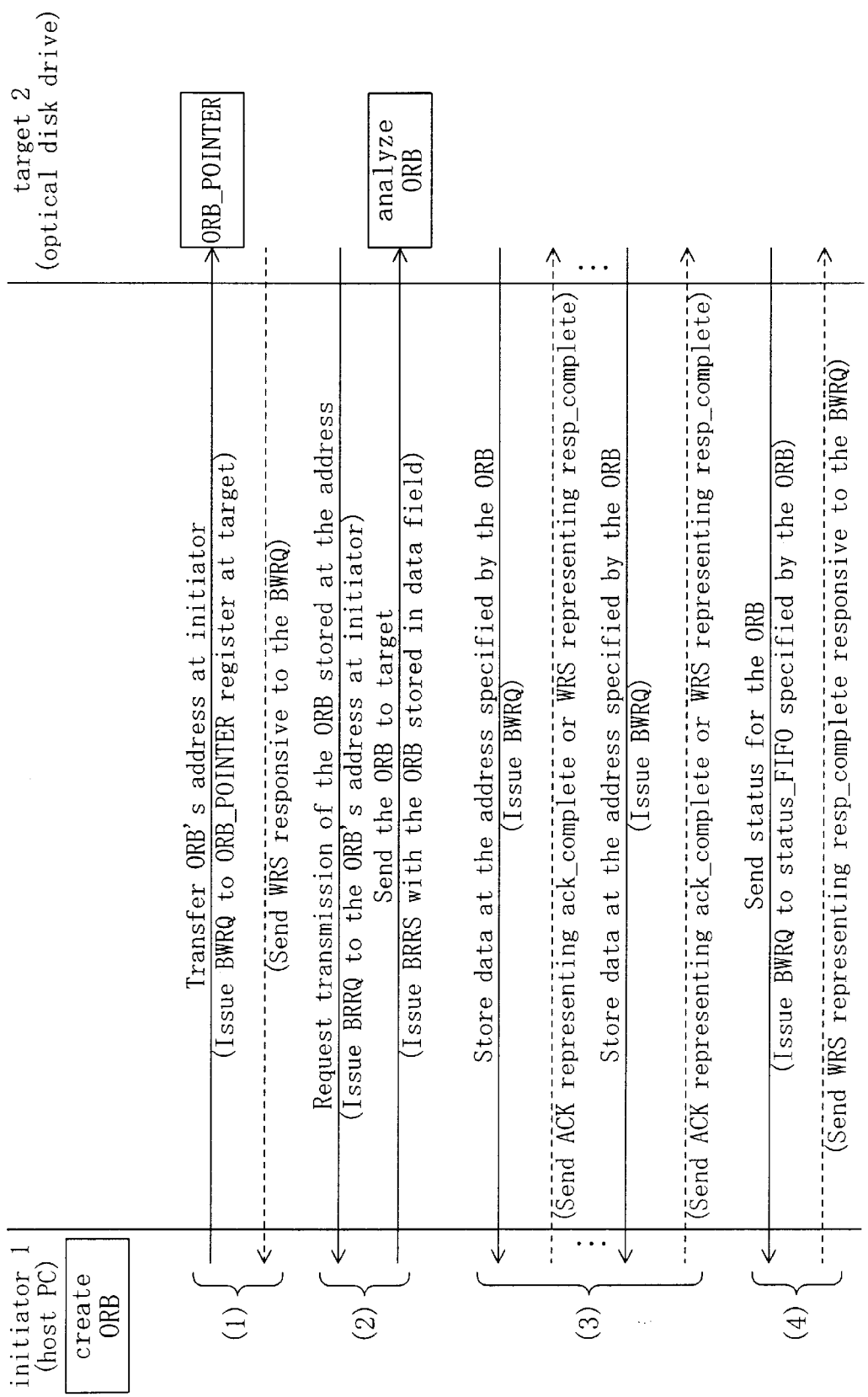

DATA EXCHANGE UNIT

BACKGROUND OF THE INVENTION

The present invention relates to a data exchange unit for transferring data, commands and so on in packets from a computer to a peripheral device such as optical disk drive, or vice versa, over a transmission line.

In recent years, a telecommunications system complying with the IEEE 1394 standard has attracted much attention as a digital interface for interconnecting together audiovisual (AV) and computer components. The IEEE 1394 system is applicable to communicating not only between computer components, but also between AV components. This is because the IEEE 1394 standard defines both asynchronous and isochronous communications techniques alike. The asynchronous communications technique is applied to transferring computer data, for example, which does not always have to be transmitted in real time but must be highly accurate and reliable. On the other hand, the isochronous communications technique is applied to transferring AV data of a moving picture, for example, from which not so much reliability as real-time transmission is demanded more strongly. Thus, generally speaking, the asynchronous communications technique is preferred in writing computer data on an optical disk drive or reading computer data already recorded from the optical disk drive in accordance with the IEEE 1394 standard, for example. As for communications protocols defined for asynchronous communication between an initiator and a target, Serial Bus Protocol-2 (SBP-2) is under deliberation at the American National Standards Institute (ANSI). The SBP-2 standard defines various task management commands such as Login, QueryLogin and Abort-Task and data exchange techniques by indirect addressing using a page table.

A conventional data exchange unit on the target end includes buffers exclusively used for transmission and reception (in this specification, these buffers will be called "transmission buffer" and "reception buffer", respectively). The size of each of these buffers is usually equal to the size of a maximum transferable packet. First-in-first-out buffers (FIFOS) implemented as these buffers are called "asynchronous transmission FIFO buffer (ATF)" and "asynchronous reception FIFO buffer (ARF)", respectively. In the prior art, a single central processing unit (CPU) performs various types of processing, including management of the ATF and ARF, in accordance with a program.

In the conventional data exchange unit, however, the CPU often suffers from overload. For example, the CPU has to make request and response packets, write these packets on the ATF, read received packets from the ARF and analyze the header field of a received packet. In addition, the CPU also has to carry out appropriate processing in response to a task management command that has been issued from the initiator. Furthermore, if the initiator has issued a task management command or a request for accessing a configuration read-only memory (config_ROM) or control and status registers (CSR) on the target while data is being transferred, then the CPU must manage suspension or rebooting of the data transfer. Moreover, if the initiator has issued a request for transferring data using a page table, then the CPU has to control the reception of page table data from the initiator and the transmission of the requested data responsive to the page table data on a page-by-page basis. Accordingly, the conventional data exchange unit is disadvantageous in that heavy overheads are necessary for CPU's firmware processing and that it takes a long time to exchange data.

SUMMARY OF THE INVENTION

An object of the present invention is cutting down the heavy overheads involved with CPU's firmware processing, thereby exchanging data at higher speeds.

To achieve this object, an inventive data exchange unit is adapted to communicate with a counterpart unit through a transmission line using, as a unit, a packet including header and data fields. The exchange unit includes: a transmission buffer; a reception buffer; a transmission-reception buffer; a transmission filter for selectively storing a packet to be transmitted on either the transmission buffer or the transmission-reception buffer depending on the contents of the packet to be transmitted; a reception filter for selectively storing a received packet on either the reception buffer or the transmission-reception buffer depending on the contents of the received packet; a packet processor for making a packet containing information to be transmitted or fetching necessary information from the received packet; a transceiver for converting the packet that has been stored on the transmission buffer or the transmission-reception buffer into an electrical signal to be transmitted through the transmission line or converting another electrical signal received through the transmission line into the packet that will be stored on the reception buffer or the transmission-reception buffer; and a central processing unit (CPU) for activating the packet processor. If a response packet paired with a request packet has been received, then the reception filter stores the response packet received on the transmission-reception buffer and informs the packet processor of response detected. Alternatively, if any other response packet has been received in response to the request packet, then the reception filter stores the received packet on the reception buffer and issues a suspension instruction to the packet processor.

In one embodiment of the present invention, the packet processor preferably includes: a request packet counter for counting the number of request packets provided to the transmission filter; a response packet counter for counting the number of response packets that have been read out from the transmission-reception buffer; and a suspension controller for instructing to stop making new request packets and to inform the CPU of completion of suspension when a count of the response packet counter matches that of the request packet counter in accordance with the suspension instruction. In such an embodiment, if a packet received during a data exchange operation has nothing to do with the operation, then the data exchange will be suspended once a transaction, which is being performed when the packet is received, is completed, and the CPU may use the transmission, reception and transmission-reception buffers freely. More particularly, the packet processor preferably further includes means for accepting a data exchange reboot instruction from the CPU after the CPU has been informed of the completion of suspension.

Another inventive data exchange unit includes: a transmission buffer; a reception buffer; a transmission-reception buffer; a transmission filter for selectively storing a packet to be transmitted on either the transmission buffer or the transmission-reception buffer depending on the contents of the packet to be transmitted; a reception filter for selectively storing a received packet on either the reception buffer or the transmission-reception buffer depending on the contents of the received packet; a packet processor for making a packet containing information to be transmitted or fetching necessary information from the received packet; a transceiver for converting the packet that has been stored on the transmission buffer or the transmission-reception buffer into an electrical signal to be transmitted through the transmission line or converting another electrical signal received through the transmission line into the packet that will be stored on the reception buffer or the transmission-reception buffer; a page table memory for storing page table data, which will be used for indirectly addressing a memory location in the counterpart unit; a packet transmission controller for controlling the packet processor; and a central processing unit (CPU) for activating the packet transmission controller. If the CPU has received a request for transferring data using a page table by way of the reception buffer and has activated the packet transmission controller, then the packet transmission controller instructs the packet processor to make a request packet for acquiring the page table data from the counterpart unit. After the packet processor has acquired the page table data by way of the transmission-reception buffer, the packet transmission controller stores the page table data on the page table memory, and then instructs the packet processor to make another request packet requesting an access to a memory location in the counterpart unit that has been specified by the page table data stored on the page table memory. In the data exchange unit with such a configuration, after the packet transmission controller has been activated, data exchange using the page table is carried out automatically without CPU's intervention.

BRIEF DESCRIPTION OF THE DRAWINGS

FIGS. 2A through 2E illustrate various formats of packets to be transferred on the IEEE 1394 bus shown in FIG. 1.

FIG. 5 illustrates operations to be performed by the communications system shown in FIG. 1 when a READ command is executed.

DETAILED DESCRIPTION OF THE INVENTION

Hereinafter, an embodiment of the present invention will be described in detail with reference to the accompanying drawings. It will be apparent to those skilled in the art, however, that the present invention is in no way limited to the following particular embodiment but may assume many embodiments other than that specifically set out and described below.

Figure 1:
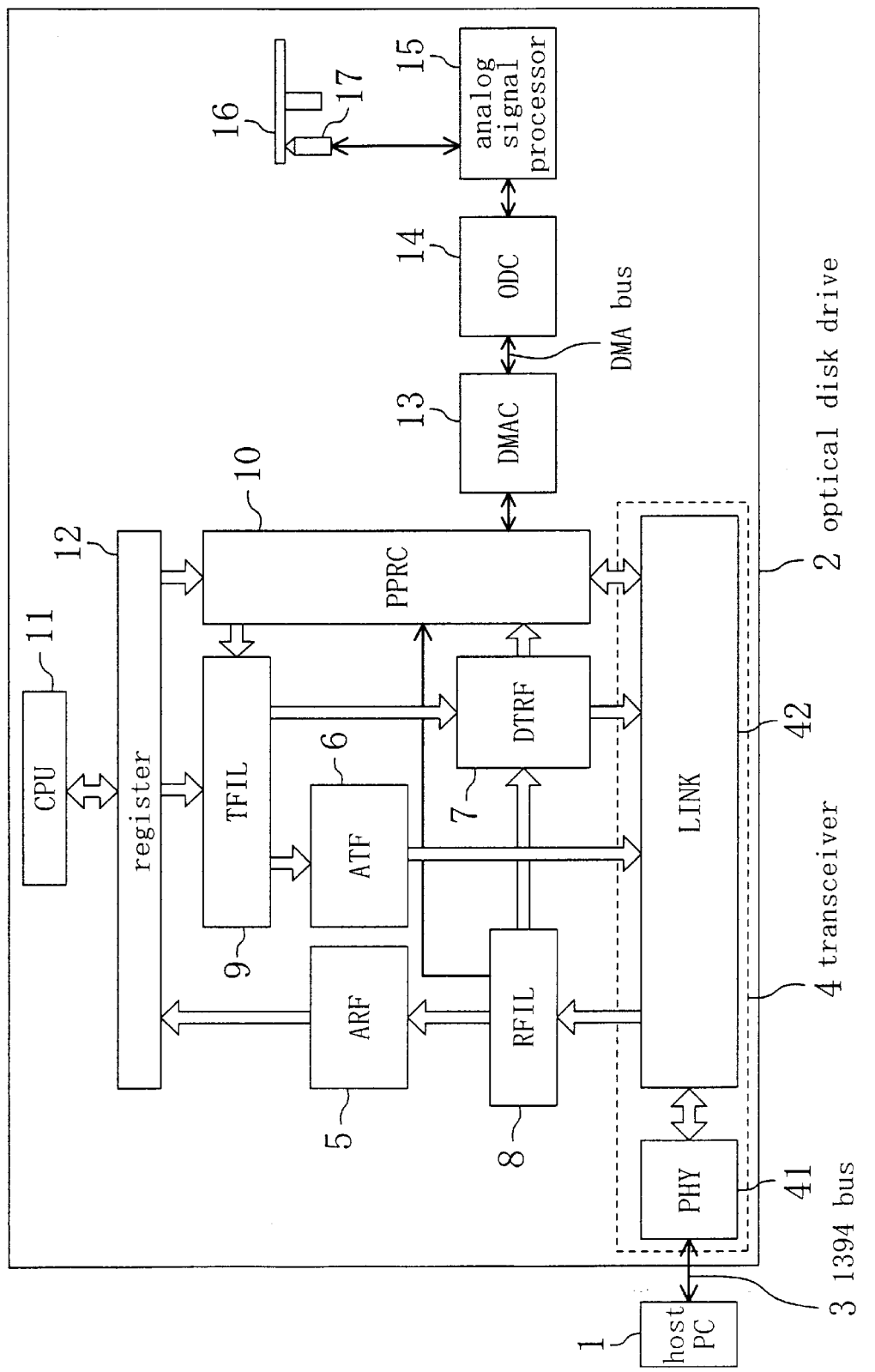
FIG. 1 is a block diagram illustrating an exemplary internal configuration for an optical disk drive including a data exchange unit according to the present invention.

FIG. 1 illustrates an exemplary configuration for a communications system including a data exchange unit according to an embodiment of the present invention. As shown in FIG. 1, the communications system includes a host personal computer (PC) 1, an optical disk drive 2 and an IEEE 1394 serial bus 3, which couples the host PC 1 and the optical disk drive 2 together. The host PC 1 issues a command or transmits or receives data to/from the optical disk drive 2. In this specification, the host PC 1 and the optical disk drive 2 will sometimes be called "initiator" and "target", respectively. The optical disk drive 2 includes: transceiver 4; reception buffer 5; transmission buffer 6; transmission-reception buffer 7; reception filter 8; transmission filter 9; packet processor 10; CPU 11; register 12; direct memory access controller 13; optical disk controller 14; analog signal processor 15; and optical head 17. The transceiver 4 includes a physical layer controller (PHY) 41 and a link layer controller (LINK) 42. The PHY 41 initializes the IEEE 1394 bus 3, encodes or decodes data, conducts arbitration and outputs or senses a bias voltage. The LINK 42 generates or detects cyclic redundancy codes (CRCS) or packets. The reception buffer 5 is implemented as an asynchronous reception FIFO buffer (ARF) for receiving a command, for example. The transmission buffer 6 is implemented as an asynchronous transmission FIFO buffer (ATF) for transmitting a status, for instance. The transmission-reception buffer 7 is implemented as a data transmission and reception FIFO buffer (DTRF). The reception filter (RFIL) 8 selectively stores a received packet on either the ARF 5 or DTRF 7 depending on the contents thereof. The transmission filter (TFIL) 9 selectively stores a packet to be transmitted on either the ATF 6 or DTRF 7 depending on the contents thereof. The packet processor (PPRC) 10 extracts only necessary data from a received packet and converts the extracted data into data to be transferred to the optical disk controller (ODC) 14 through the direct memory access controller (DMAC) 13 and a DMA bus. Alternatively, the PPRC 10 applies a header to, or packetizes, the data that has been read out from an optical disk 16 by the head 17, processed by the analog signal processor 15 in a predetermined manner and then demodulated or error-correction coded by the ODC 14. The register 12 is connected to the CPU 11.

FIGS. 2A through 2E illustrate formats of some of asynchronous packets as defined by the IEEE 1394 standard. The IEEE 1394 standard defines a request packet requesting an operation to be performed and a response packet returning the result of the operation requested by the request packet. No matter whether the request or response packet has been received at a recipient, the recipient always returns an acknowledge (ACK) packet, which represents the reception state of the packet, to its sender. The ACK packet may represent that processing is completed (ack_complete) or that the packet has been received certainly but is now being processed (ack_pending) or that the packet should be sent again (ack_busy). The request and response packets are ordinarily used in pairs. But depending on the contents of the ACK packet, processing may be completed just by receiving the ACK packet.

Figure 2A:
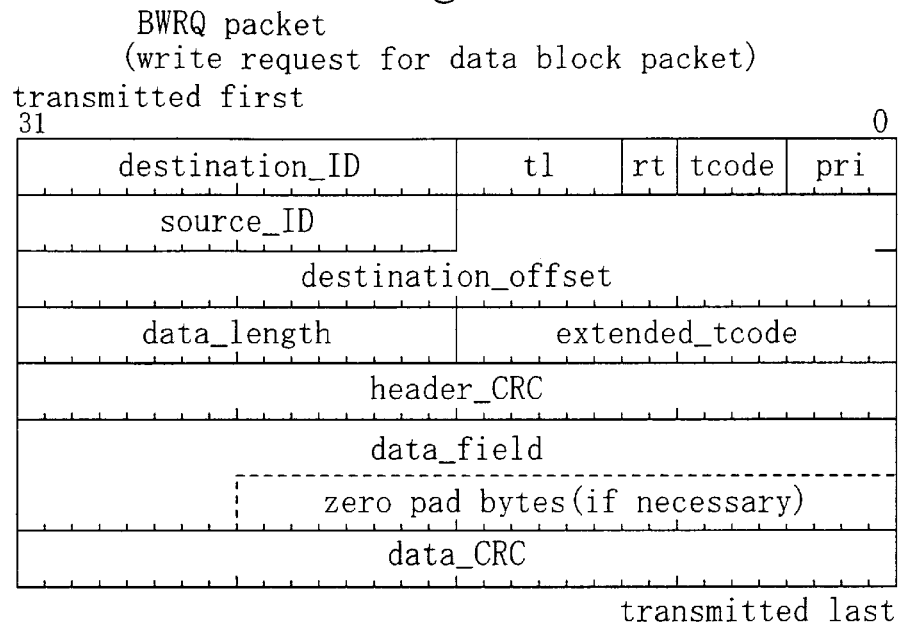
Figure 2B:
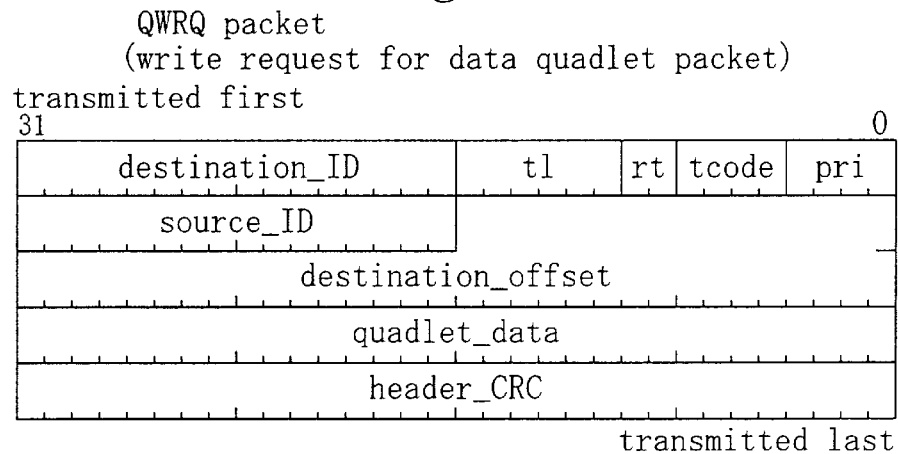
Figure 2C:
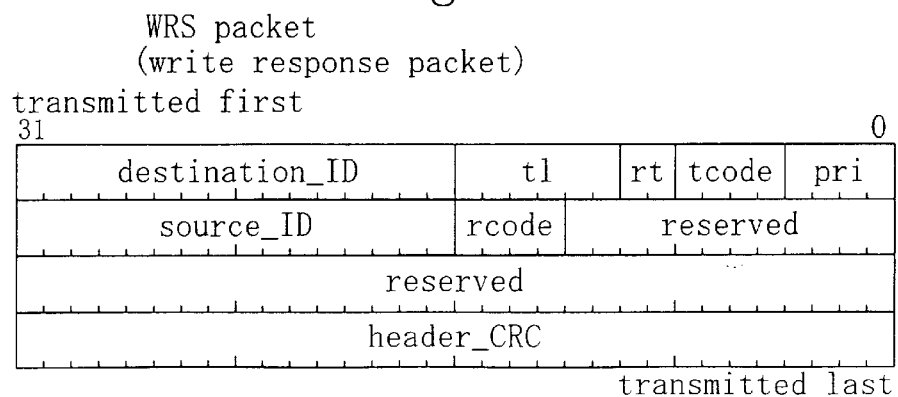
Figure 3A:
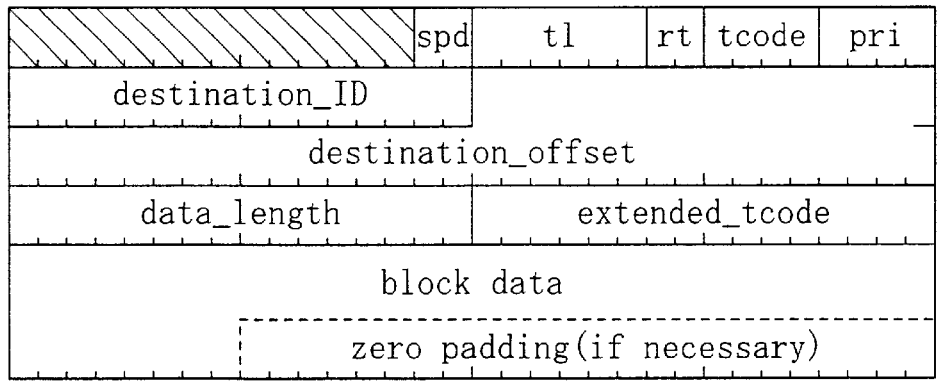
FIGS. 3A through 3E illustrate various formats of internal packets in the optical disk drive shown in FIG. 1.
Figure 3B:
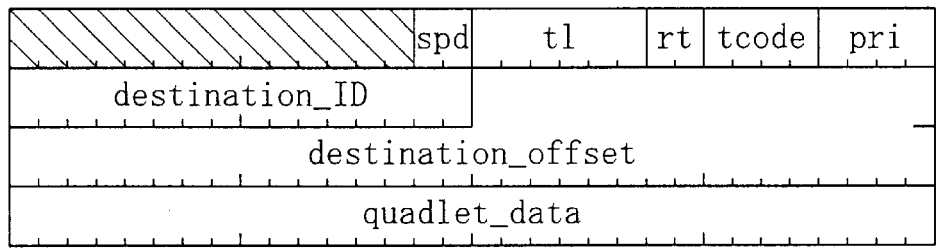
Figure 3C:
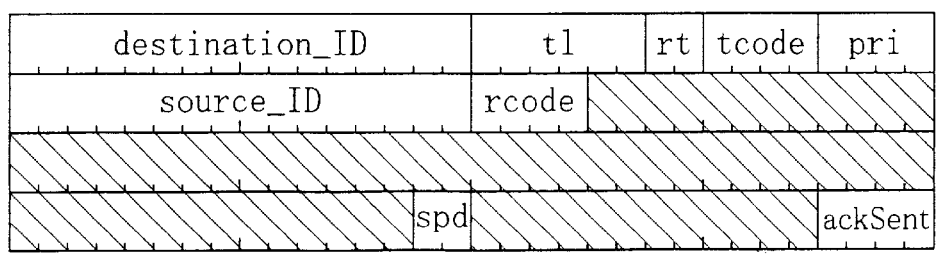
Figure 3D:
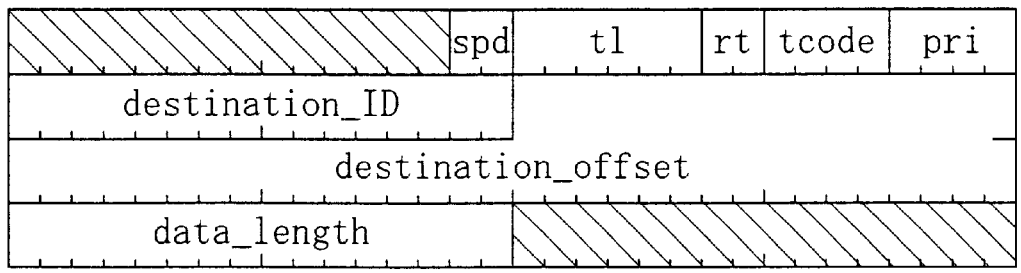
Figure 3E:
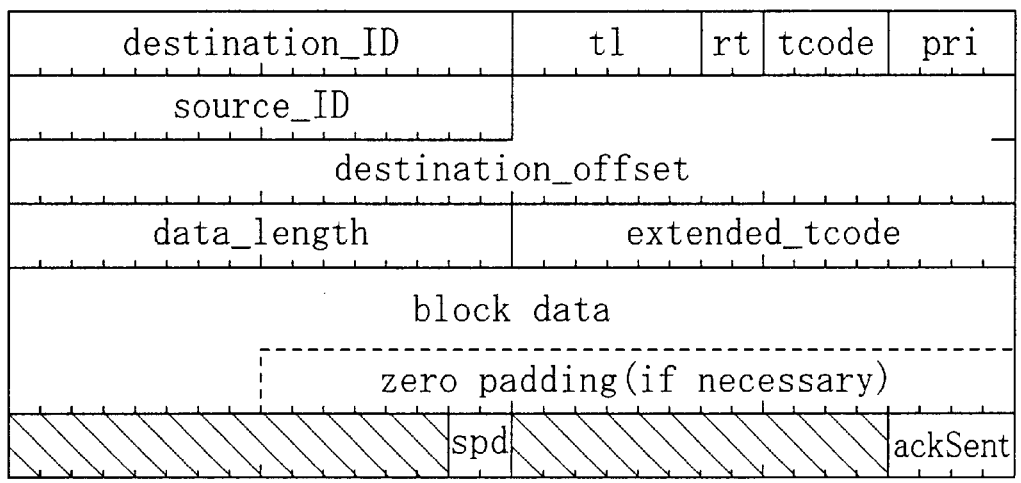

FIGS. 2A, 2B and 2D illustrate a write request for data block (BWRQ) packet, a write request for data quadlet (QWRQ) packet and a read request for data block (BRRQ) packet, respectively. A write response (WRS) packet shown in FIG. 2C is defined as a response packet responding to the write request (BWRQ or QWRQ) packet. A read response for data block (BRRS) packet shown in FIG. 2E is defined as a response packet responding to the BRRQ packet. In each of these packets, a transaction code tcode providing identification information of the type of the packet and a transaction label tl representing tag information unique to the transaction are contained. Also, in a response packet, a response code rcode representing the response state is contained. Accordingly, the type of a transaction is identifiable by tcode and a pair of request and response packets is recognizable by tl. For further details, see the IEEE Standard 1394–1995.

FIGS. 3A through 3E illustrate respective formats of internal packets in the optical disk drive 2 shown in FIG. 1 and correspond to FIGS. 2A through 2E, respectively. In FIGS. 3A through 3E, the hatched portions are reserved areas. Any of the internal packets to be transmitted is subjected to restructuring by the LINK 42 to compute header_CRC and/or data_CRC or to add source_ID. Any of the received internal packets represents a result of error detection and correction performed by the LINK 42.

First, suppose the target 2 should receive data from the initiator 1. If a BRRS packet, which includes, in its data field, data responding to a BRRQ packet requesting the transmission of the data from the initiator 1, has been received at the target 2, then the RFIL 8 stores the received BRRS packet on the DTRF 7. If a packet of any other type has been received, then the RFIL 8 stores the packet on the ARF 5. Next, suppose the target 2 should transmit data to the initiator 1. If the RFIL 8 has determined based on tcode, rcode and tl of a received packet that a WRS packet, which is paired with a BWRQ packet including, in its data field, data to be transmitted, has been received, then the RFIL 8 stores the received packet on the DTRF 7 and informs the PPRC 10 of response detected. If a packet of any other type has been received, then the RFIL 8 stores the received packet on the ARF 5 and issues a suspension instruction to the PPRC 10. In transmitting data, the TFIL 9 selectively determines based on tcode of a packet to be transmitted whether the packet should be stored on the ATF 6 or the DTRF 7.

Figure 4:
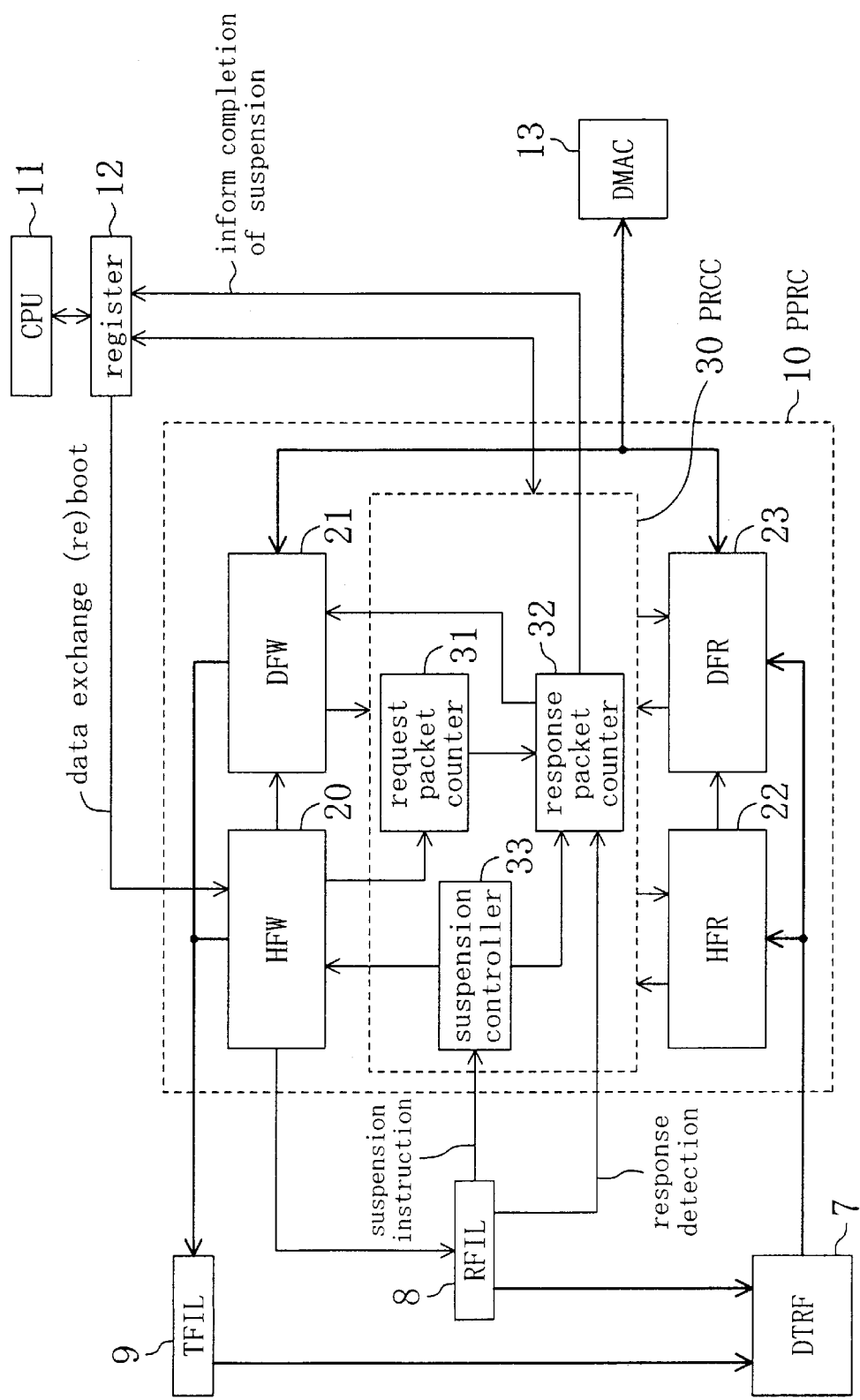
FIG. 4 is a block diagram illustrating an exemplary detailed configuration of the packet processor shown in FIG. 1.

FIG. 4 illustrates a detailed configuration of the PPRC 10 shown in FIG. 1. The PPRC 10 includes header field write circuit (HFW) 20, data field write circuit (DFW) 21, header field read circuit (HFR) 22, data field read circuit (DFR) 23 and process controller (PRCC) 30. The PRCC 30 includes request packet counter 31, response packet counter 32 and suspension controller 33. The HFW 20 makes a BRRQ packet requesting transmission of data when the data should be received from the initiator 1 or makes a header field including data for a BWRQ packet when the data should be transmitted to the initiator 1. Then, the HFW 20 passes the BRRQ packet or the header field for the BWRQ packet to the TFIL 9 in either case. Also, the HFW 20 determines the data_length in a packet in accordance with the size of a payload that has been provided from the CPU 11 via the register 12. If a large quantity of data should be transmitted in multiple packets separately, then the HFW 20 sets mutually different tl values for header fields in respective packets and updates destination_offset. When data should be transmitted to the initiator 1, the DFW 21 receives the data from the DMAC 13 in accordance with the value of data_length provided from the HFW 20 and then passes the data to the TFIL 9 such that the data succeeds the header of the BWRQ packet that has been made and passed to the TFIL 9 by the HFW 20. The request packet counter 31 counts the number of request packets that have been provided to the TFIL 9. When data should be received from the initiator 1, the HFR 22 reads out the header field from a BRRS packet responding to a BRRQ packet. On the other hand, when data should be transmitted to the initiator 1, the HFR 22 reads out the header field from a WRS packet responding to a BWRQ packet. Then, the HFR 22 checks its rcode in either case. Unless rcode is resp_complete, the CPU 11 is informed of the activity by way of the PRCC 30 and the register 12. When data should be received from the initiator 1, the DFR 23 reads out data from the DTRF 7 in accordance with the value of $data_{13}$ length provided from the HFR 22 and transfers the data to the DMAC 13 concurrently, after the HFR 22 has read out the header field from the BRRS packet. The response packet counter 32 counts not only the number of response packets that have been read out from the DTRF 7 but also a cumulative number of data bytes transferred. At a point in time when the count of the request packet counter 31 matches that of the response packet counter 32 and the number of data bytes to be transferred that has been provided from the CPU 11 via the register 12 matches the cumulative number thereof, the response packet counter 32 determines that the data exchange is completed. Then, the response packet counter 32 informs the CPU 11 of the completion by way of the register 12. If the RFIL 8 has detected the reception of a packet other than an expected response packet responding to the request packet issued by the PPRC 10 during data exchange, then the suspension controller 33 instructs the HFW 20 to stop making new packet headers. The suspension controller 33 also instructs the response packet counter 32 to inform the CPU 11 of the completion of suspension by way of the register 12 when the count of the request packet counter 31 matches that of the response packet counter 32.

FIG. 5 illustrates the basic operations to be performed when data is exchanged between the initiator 1 and the target 2 in accordance with the SBP-2 protocol. Hereinafter, operations to be performed when the initiator 1 reads out data from the target 2, i.e., a situation where the initiator 1 has issued a READ command, will be described with reference to FIG. 5. It should be noted that before the data is actually exchanged, various data items or commands are actually exchanged between the initiator 1 and the target 2. However, the description of these exchange operations will be omitted herein.

(1) When data exchange is booted, the initiator 1 issues a BWRQ packet to an ORB_POINTER register defined within the CSR space at the target 2. The BWRQ packet includes, in its data field, an address of an operation request block (ORB) that has been created in its system memory. Then, the initiator 1 writes the packet on the ORB_POINTER register at the target 2. The ORB includes a command from the initiator 1. In response, the target 2 returns a WRS packet, whose rcode represents completion of processing resp_complete.

(2) Then, the target 2 issues a BRRQ packet to the system memory address of the initiator 1, at which the ORB is stored. On receiving the BRRQ packet, the initiator 1 stores the ORB in the data field of a BRRS packet, which is the response packet of the BRRQ packet, and sends the BRRS packet to the target 2. In this manner, the target 2 receives the ORB including a command from the initiator 1.

(3) In response, the target 2 analyzes the received ORB. Supposing the ORB represents a READ command, the target 2 prepares data to be transmitted and then issues a BWRQ packet, which includes the data in its data field, to the system memory address of the initiator 1 that is specified by the ORB in which the READ command is included. Then, the data is stored at the specified memory address in the initiator 1. In this case, the size of the BWRQ packet depends on the transfer rate of the IEEE 1394 bus 3. Thus, if a large quantity of data needs to be transferred, then the data should be divided into plural data blocks and transferred in multiple BWRQ packets. In the illustrated embodiment, a data block is transferred while seeing if a transaction is completed. That is to say, the data block may be transferred while checking whether the target 2 has received an ACK packet representing completion of processing (ack_complete) responsive to a BWRQ packet. Alternatively, the data block may be transferred while checking whether the target 2 has received an ACK packet, representing that the BWRQ packet has been received by the initiator 1 but is now being processed (ack_pending), and then the target 2 has received a WRS packet representing resp_complete paired with the BWRQ packet.

(4) Once the data of the length specified by the ORB has been all transferred, the target 2 writes a status, corresponding to the READ command, onto the address that has been specified in advance by the initiator 1 using the BWRQ packet.

A series of operations concerning the READ command is completed in this manner. However, if the initiator 1 cannot receive a BWRQ packet that has been sent out from the target 2, then a retry (or retransmission) can be performed by making the initiator 1 return an ACK packet requesting the retransmission.

Similarly, in executing a WRITE command, the target 2 reads out data, which is stored in the system memory of the initiator 1, using BRRQ packets and then writes the data onto the optical disk 16.

Figure 6A:
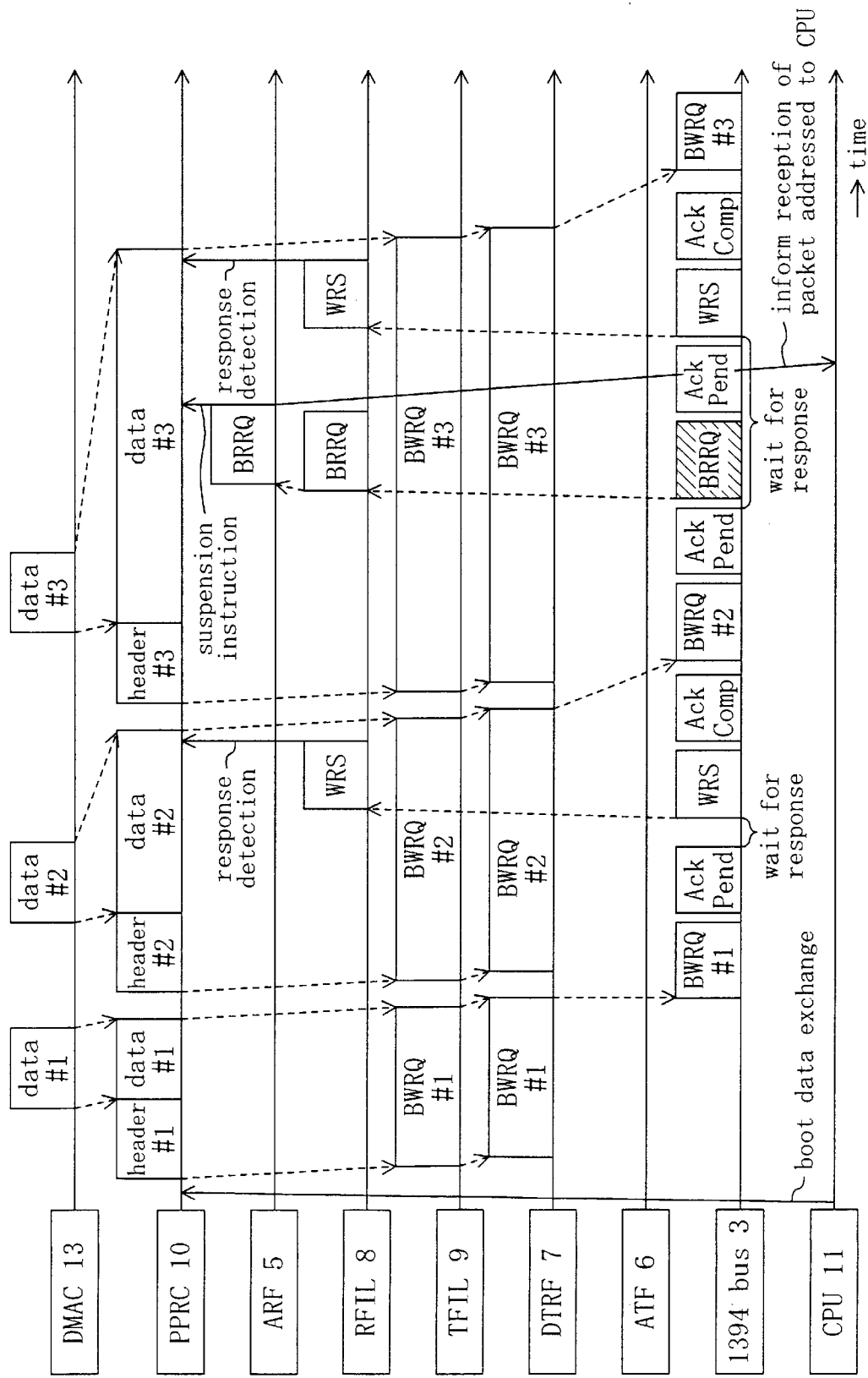
FIGS. 6A through 6C illustrate timing diagram showing the operations of respective components in FIG. 1.
Figure 6B:
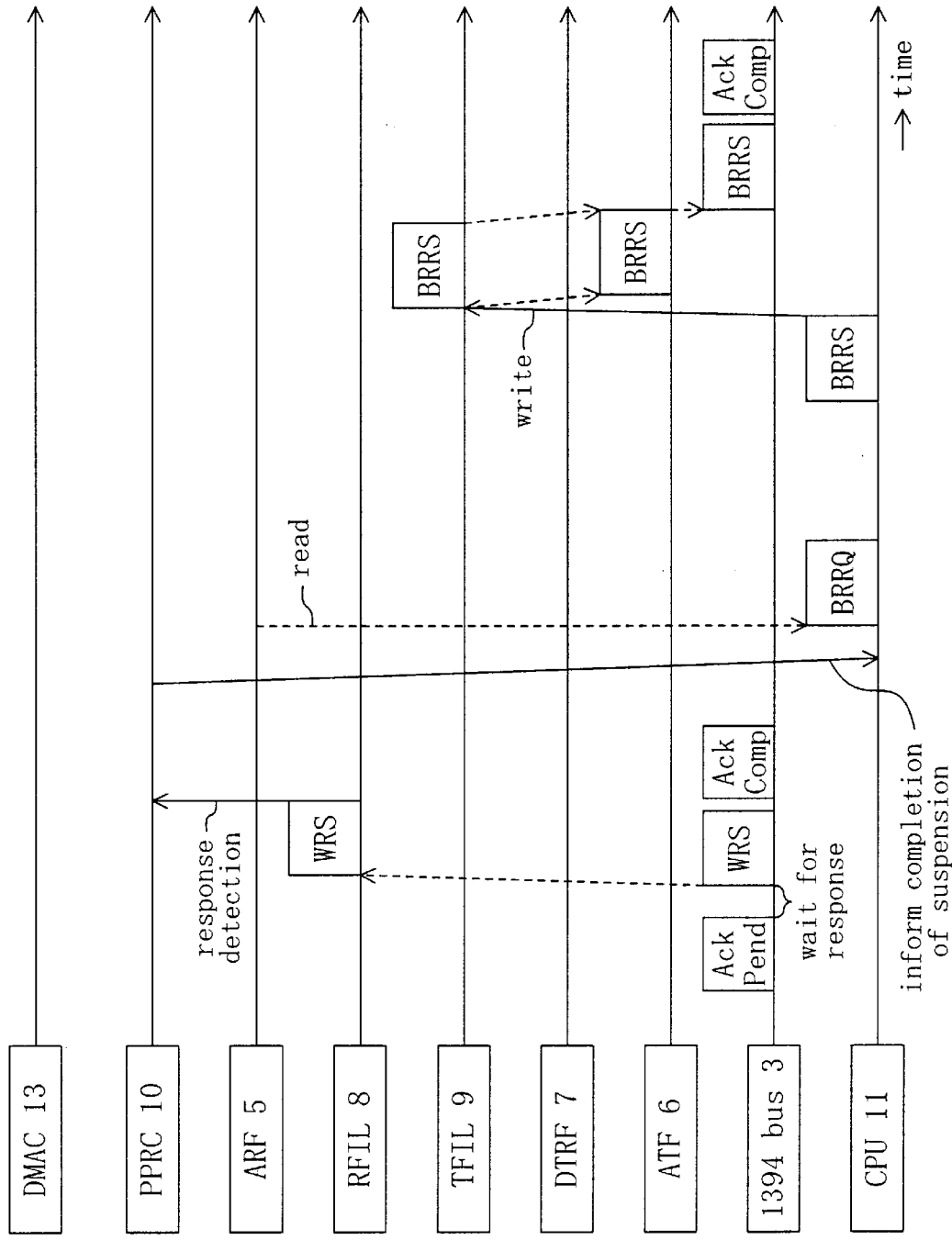
Figure 6C:
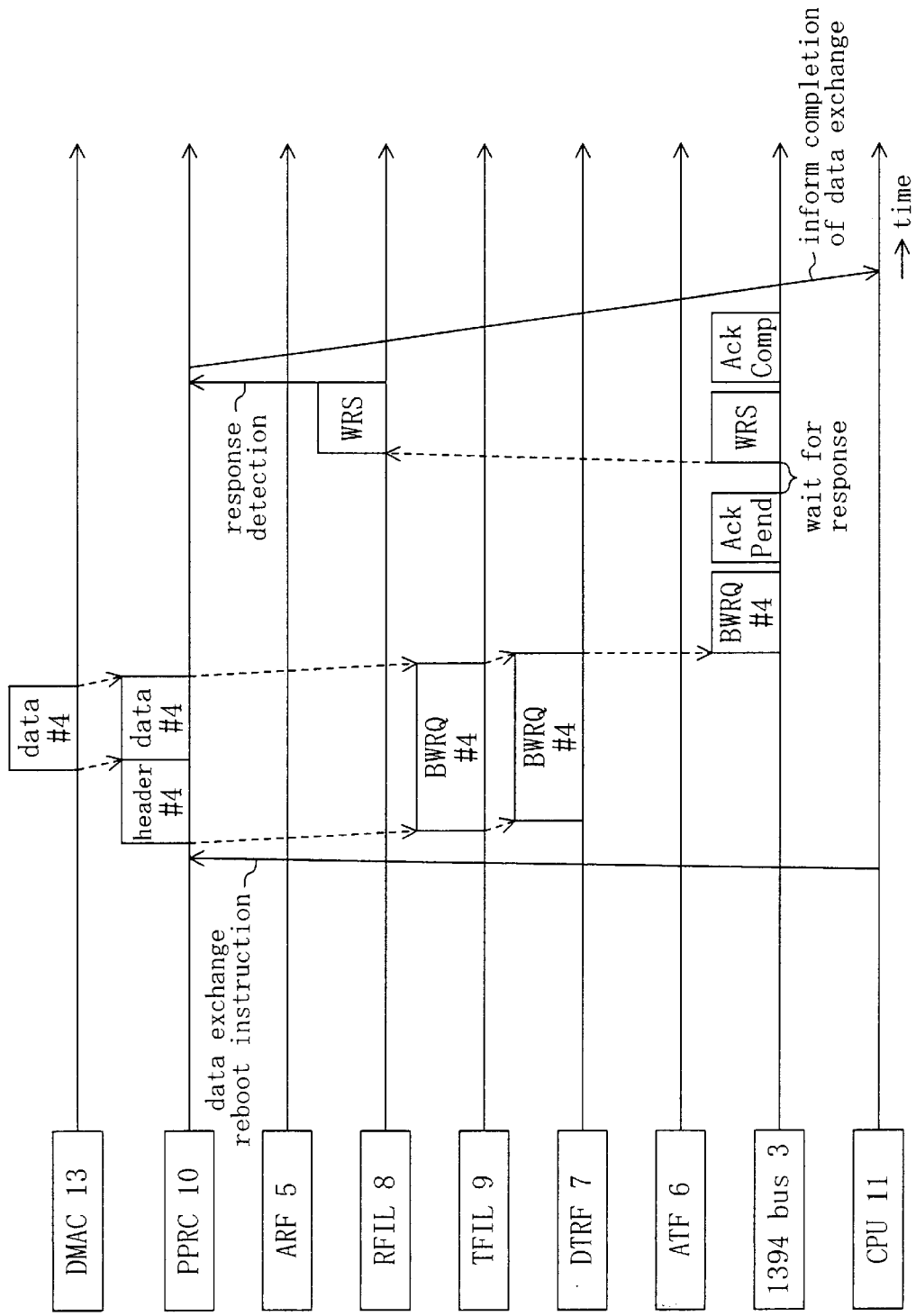

FIGS. 6A through 6C illustrate a timing diagram showing a situation where the initiator 1 issues a BRRQ packet requesting an access to a config_ROM (not shown) on the target 2 while a READ command is being executed. In the illustrated embodiment, the capacity of the DTRF 7 is represented by 2×k quadlets, where k represents the size of a maximum transferable packet. More specifically, in this embodiment, the transfer rate is supposed to be 200 Mbps (i.e., so-called "S200") and the length of transferable data that can be contained in one packet is supposed to be 1024 bytes (=256 quadlets). That is to say, the buffer size of the DTRF 7 is supposed to be twice as large as the size of a packet used in transferring data, e.g., a BWRQ packet for a READ command and a BRRS packet for a WRITE command in accordance with the SBP-2 protocol. It should be noted that the maximum size of a data field in a packet is defined by the IEEE 1394 standard in accordance with the transfer rate.

In the example illustrated in FIGS. 6A through 6C, the length of data requested from the initiator 1 is supposed to be 4096 bytes per READ command. Since the size of data block in one BWRQ packet is 1024 bytes, four BWRQ packets should be transferred in response to the READ command.

(1) The CPU 11 confirms the READ command and then performs initialization to read out requested data from the optical disk 16. In this process step, the CPU 11 writes an address in the system memory at the initiator 1, which indicates the destination where the data should be stored as specified by the READ command, and header information items such as ID of the initiator 1 onto the HFW 20 by way of the register 12.

(2) When the CPU 11 activates the HFW 20 via the register 12 to boot data exchange, the HFW 20 makes a header for BWRQ packet #1 using the information provided from the CPU 11 to transfer the first 1024 byte data, and then writes the BWRQ packet #1 on the DTRF 7 by way of the TFIL 9. As a result, the count of the request packet counter 31 is increased by one and becomes "1".

(3) Subsequently, the DFW 21 receives 1024 byte data sequentially from the DMAC 13, and writes the data onto the DTRF 7 via the TFIL 9. In this case, the HFW 20 passes tl of the BWRQ packet #1 to the RFIL 8. In this manner, the BWRQ packet #1, including the 1024 byte data, is sent out onto the 1394 bus 3 so as to be transmitted to the initiator 1.

(4) Then, the HFW 20 makes a header for BWRQ packet #2 to transfer the next 1024 byte data, and then writes the BWRQ packet #2 on the DTRF 7 by way of the TFIL 9. As a result, the count of the request packet counter 31 is increased again by one and becomes "2". In this case, the destination_offset in the header field of the BWRQ packet #2 is equal to the sum of the destination_offset of the BWRQ packet #1 transmitted previously and 1024. Also, tl has been increased by one.

(5) Subsequently, the DFW 21 receives 1024 byte data sequentially from the DMAC 13, and writes part of the data up to 1020 byte onto the DTRF 7 via the TFIL 9. The last 4 bytes are not written to prevent the BWRQ packet #2 from being sent out onto the 1394 bus 3. In this state, the PPRC 10 waits for response to the BWRQ packet #1.

(6) On receiving the BWRQ packet #1, the initiator 1 sends back a WRS packet responsive to the BWRQ packet #1.

(7) The WRS packet, which has been received by the target 2, is provided to the RFIL 8. After having identified tcode and tl of the received packet with that of the WRS packet and that of the BWRQ packet #1, respectively, and confirmed that rcode of the received packet is resp_complete, the RFIL 8 sends a response detection signal to the response packet counter 32. Having received this response detection signal, the PPRC 10 confirms that the transaction has ended normally. As a result, the count of the response packet counter 32 is increased by one and becomes "1".

(8) The response packet counter 32, which has received the response detection signal, informs the DFW 21 of the reception. In response, the DFW 21 writes the last 4 bytes of the BWRQ packet #2 onto the DTRF 7 by way of the TFIL 9. At this time, the HFW 20 passes tl of the BWRQ packet #2 to the RFIL 8. In this manner, the BWRQ packet #2, including the 1024 byte data, is sent out onto the 1394 bus 3 so as to be transmitted to the initiator 1.

(9) Then, the HFW 20 makes a header for BWRQ packet #3 to transfer the next 1024 byte data, and then writes the BWRQ packet #3 on the DTRF 7 by way of the TFIL 9. As a result, the count of the request packet counter 31 is further increased by one and becomes "3". In this case, the destination_offset in the header field of the BWRQ packet #3 is equal to the sum of the destination_offset of the BWRQ packet #2 transmitted last time and 1024. Also, tl has been increased by one.

(10) Subsequently, the DFW 21 receives 1024 byte data sequentially from the DMAC 13, and writes part of the data up to 1020 byte onto the DTRF 7 via the TFIL 9. The last 4 bytes are not written to prevent the BWRQ packet #3 from being sent out onto the 1394 bus 3. In such a state, the PPRC 10 waits for response to the BWRQ packet #2.

(11) The initiator 1, which has received the BWRQ packet #2, issues a BRRQ packet (as indicated by hatching in FIG. 6A) requesting an access to the config_ROM (not shown) and then sends back a WRS packet responsive to the BWRQ packet #2.

(12) The BRRQ packet that has been received by the target 2 is provided to the RFIL 8. Since tcode of the received packet is different from that of the expected WRS packet, the RFIL 8 informs the CPU 11 that a packet addressed to the CPU 11 has been received, and stores the packet on the ARF 5. Although the CPU 11 receives this information, the CPU 11 has to wait for the completion of suspension because the data is now being transferred. At the same time, the RFIL 8 issues a suspension instruction to the suspension controller 33.

Following the suspension instruction, the suspension controller 33 instructs the HFW 20 to stop making new request packets and also instructs the response packet counter 32 to inform the CPU 11 of the completion of suspension when the count of the response packet counter 32 matches that of the request packet counter 31.

The WRS packet, which has been received by the target 2 subsequently, is provided to the RFIL 8. After having identified tcode and tl of the received packet with that of the WRS packet and that of the BWRQ packet #2, respectively, and confirmed that rcode of the received packet is resp__ complete, the RFIL 8 sends a response detection signal to the response packet counter 32. Having received this response detection signal, the PPRC 10 confirms that the transaction has ended normally. As a result, the count of the response packet counter 32 is increased by one again and becomes "2".

(13) The response packet counter 32, which has received the response detection signal, informs the DFW 21 that the count of the response packet counter 32 is still different from that of the request packet counter 31. In response, the DFW 21 writes the last 4 bytes of the BWRQ packet #3 onto the DTRF 7 by way of the TFIL 9. At this time, the HFW 20 passes tl of the BWRQ packet #3 to the RFIL 8. In this manner, the BWRQ packet #3, including the 1024 byte data, is sent out onto the 1394 bus 3 so as to be transmitted to the initiator 1. In this case, the HFW 20 makes no header for any new BWRQ packet.

(14) On receiving the BWRQ packet #3, the initiator 1 sends back a WRS packet responsive to the BWRQ packet #3.

(15) The WRS packet, which has been received by the target 2, is provided to the RFIL 8. After having identified tcode and tl of the received packet with that of the WRS packet and that of the BWRQ packet #3, respectively, and confirmed that rcode of the received packet is resp__complete, the RFIL 8 sends a response detection signal to the response packet counter 32. Having received this response detection signal, the PPRC 10 confirms that the transaction has ended normally. As a result, the count of the response packet counter 32 is further increased by one and becomes "3". That is to say, now that the count of the response packet counter 32 matches that of the request packet counter 31, the response packet counter 32 informs the CPU 11 of the completion of suspension by way of the register 12. Also, by this point in time, the ARF 5, ATF 6 and DTRF 7 have all been vacated, thus allowing the CPU 11 to transmit or receive packets freely.

(16) On receiving the information about the completion of suspension, the CPU 11 makes a BRRS packet responsive to the BRRQ packet that has already been received from the initiator 1, and writes the BRRS packet on the ATF 6. Then, the BRRS packet is sent out onto the 1394 bus 3 and returned to the initiator 1.

(17) The CPU 11 boots another transaction if necessary. And when there is no need for the CPU 11 to boot any, the CPU 11 instructs the HFW 20 to restart data exchange via the register 12.

(18) The PPRC 10 ends the data exchange by transferring the last 1024 byte data in the same way as the transaction #3 and informs the CPU 11 of the end of data exchange. As a result, the data exchange is completed.

As is apparent from the foregoing description, not only the ARF 5 and ATF 6 but also the DTRF 7 are provided and selectively used depending on the situation according to the present invention, thus reducing the overheads involved with firmware processing and exchanging data at higher speeds. In addition, if the target 2 has received a packet that has nothing to do with a data exchange operation being performed, then the data exchange will be suspended when the transaction being processed at the time of reception is completed. As a result, the CPU 11 is allowed to carry out any other transaction freely until the data exchange is restarted.

Figure 7:
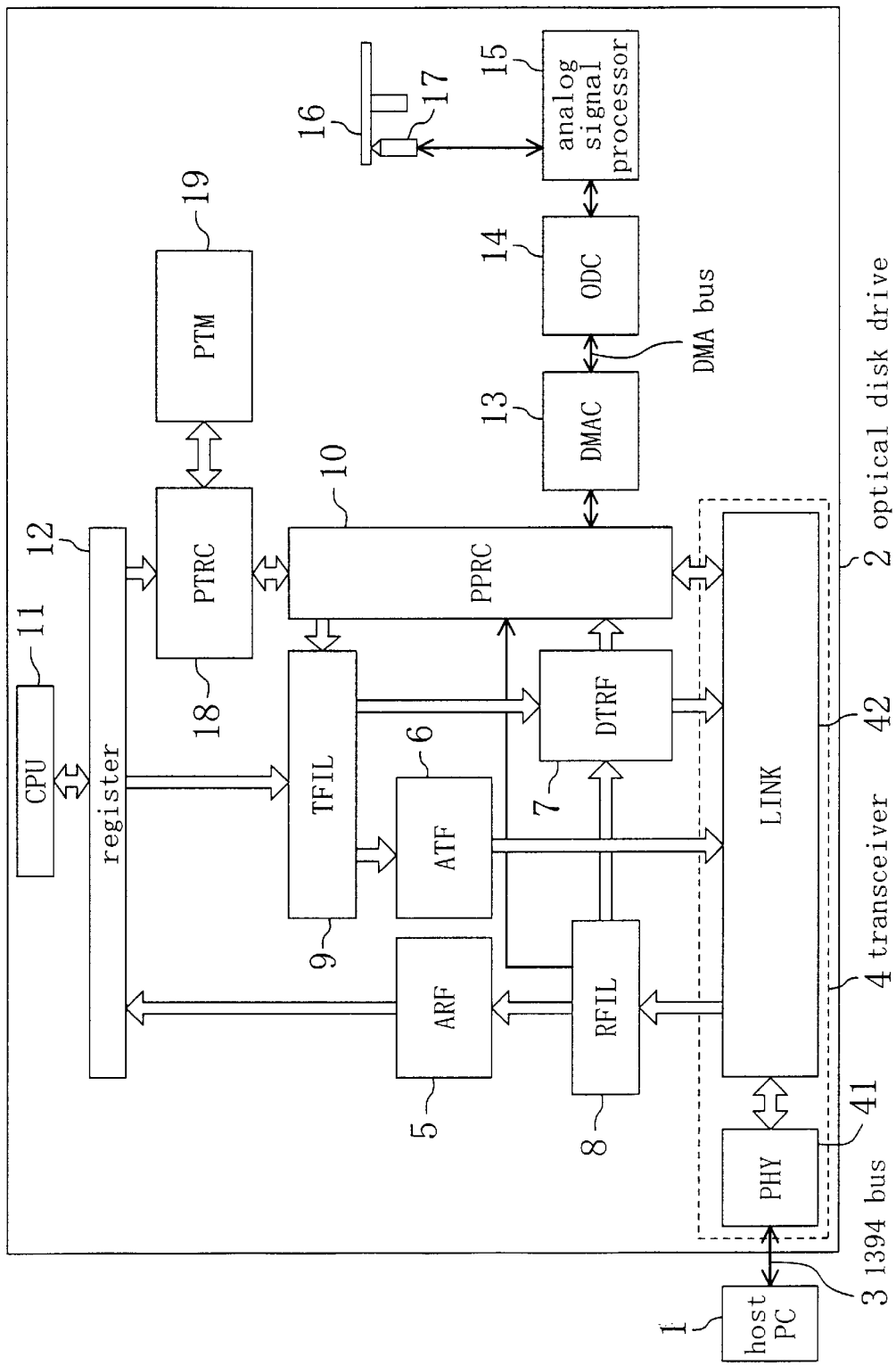
FIG. 7 is a block diagram illustrating another exemplary internal configuration for an optical disk drive including a data exchange unit according to the present invention.

FIG. 7 illustrates an exemplary configuration for a communications system including an alternative data exchange unit according to another embodiment of the present invention. The data exchange unit shown in FIG. 7 further includes packet transmission controller (PTRC) 18 and page table memory (PTM) 19 in addition to all the components of the counterpart shown in FIG. 1. The PTM 19 stores page table data, which is used for indirectly addressing a memory location in the initiator 1. The PTRC 18 is interposed between the PPRC 10 and the CPU 11 to control the PPRC 10 when activated by the CPU 11. More specifically, when the CPU 11 receives a request for data exchange using the page table via the ARF 5, the PTRC 18 is activated by the CPU 11. Then, the PTRC 18 instructs the PPRC 10 to make a BRRQ packet requesting the page table data from the initiator 1. After the PPRC 10 has received the page table data via the DTRF 7, the PTRC 18 stores the page table data on the PTM 19 and instructs the PPRC 10 to make a request packet (e.g., BWRQ packet) requesting an access to a memory location in the initiator 1 that has been addressed by the page table data stored on the PTM 19.

Figure 8:
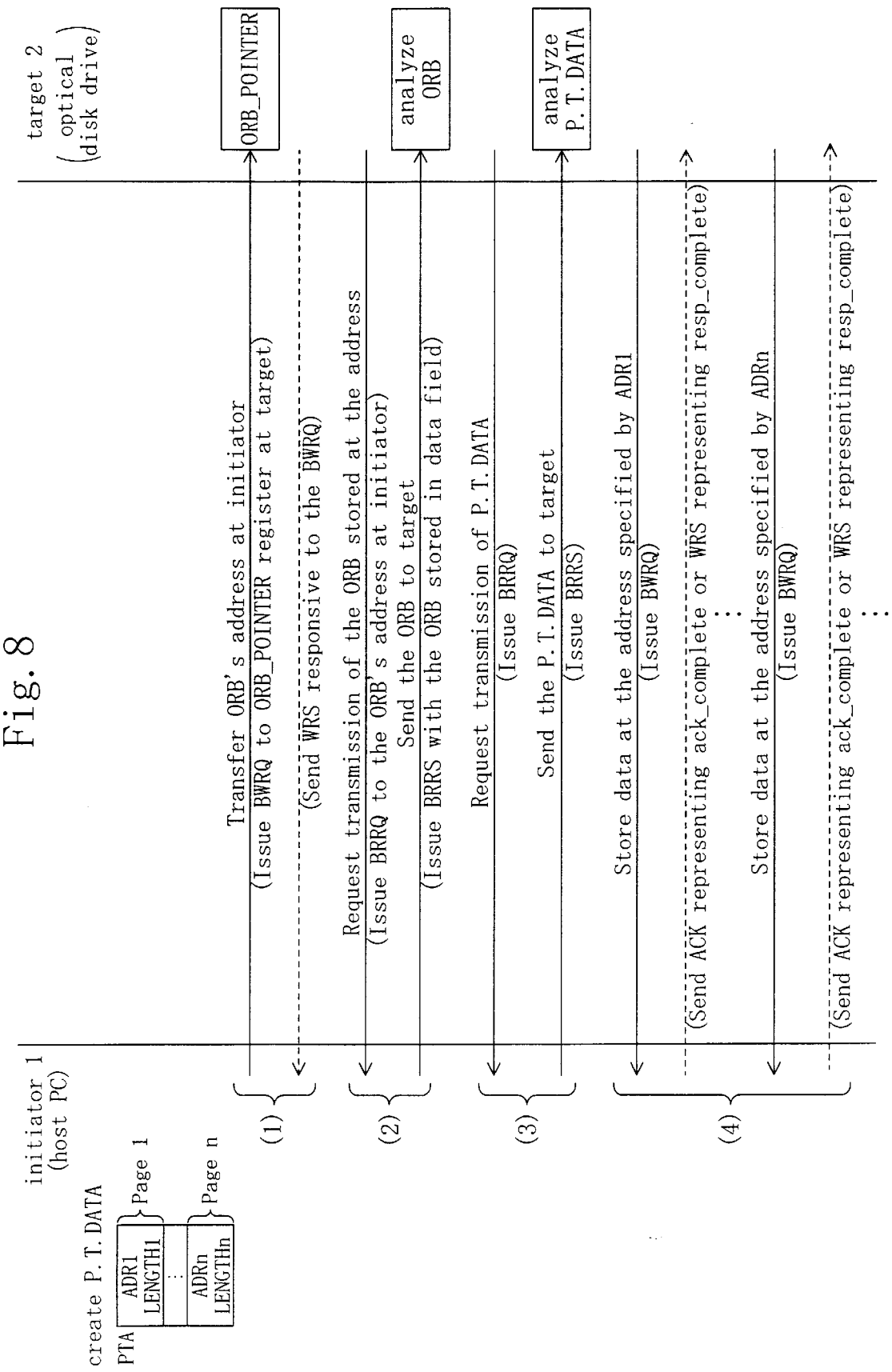
FIG. 8 illustrates operations to be performed by the communications system shown in FIG. 7 when a READ command is executed.

FIG. 8 illustrates operations to be performed in a situation where the initiator 1 has issued a READ command including a request for data exchange using the page table. First, the initiator 1 makes page table data P.T.DATA in its own system memory. In the illustrated example, a table with n pages (where n is an integer) is supposed to be drawn up. The top address of the page table is page table address PTA. Page 1 includes: an address ADR1, which represents the destination of the data, in the system memory of the initiator 1; and a data length LENGTH1. The same statement is true of any other page.

(1) When data exchange is booted, the initiator 1 issues a BWRQ packet to an ORB__POINTER register defined within the CSR space at the target 2. The BWRQ packet includes, in its data field, an address of an operation request block (ORB) that has been created in its system memory. Then, the initiator 1 writes the packet on the ORB__POINTER register at the target 2. In response, the target 2 returns a WRS packet, whose rcode represents completion of processing resp__complete.

(2) Then, the target 2 issues a BRRQ packet to the system memory address of the initiator 1, at which the ORB is stored. On receiving the BRRQ packet, the initiator 1 stores the ORB in the data field of a BRRS packet, which is the response packet of the BRRQ packet, and sends the BRRS packet back to the target 2. In this manner, the target 2 receives the ORB, i.e., a command, from the initiator 1. The ORB contains: information representing the existence of the page table; PTA; and number n of pages.

(3) Having confirmed the existence of the page table by analyzing the ORB, the target 2 issues a BRRQ packet to the address PTA in the initiator 1 to read out the page table data with n pages. In response to the BRRQ packet, the initiator 1 returns a BRRS packet, including requested page table data, to the target 2. The target 2 analyzes the page table data received and stores the result on the PTM 19.

(4) Once the target 2 has prepared data of Page 1 to be transferred, the target 2 issues a BWRQ packet, which includes the data in its data field, to the system memory address of the initiator 1 that is specified by ADR1. Then, the data is stored at the specified memory address in the initiator 1. In this case, if LENGTH1 exceeds a payload size, then the data of Page 1 should be divided into plural data blocks and transferred in multiple BWRQ packets. In the illustrated embodiment, a data block is transferred while seeing if a transaction is completed. That is to say, the data block may be transferred while checking whether the target 2 has received an ACK packet representing the completion of processing (ack complete) responsive to a BWRQ packet. Alternatively, the data block may be transferred while checking whether the target 2 has received an ACK packet, representing that the BWRQ packet has been received by the initiator 1 but is now being processed (ack_pending), and then the target 2 has received a WRS packet, which represents resp_complete and is paired with the BWRQ packet. Until the data of all the pages specified has been transferred, the PTM 19 will be referred to repeatedly.

And when all the data with the data length specified by the ORB has been transferred, the target 2 issues and sends a BWRQ packet requesting that a status concerning the READ command should be written at an address that has been specified in advance by the initiator 1. The sequence of this operation is the same as (4) shown in FIG. 5.

Figure 9A:
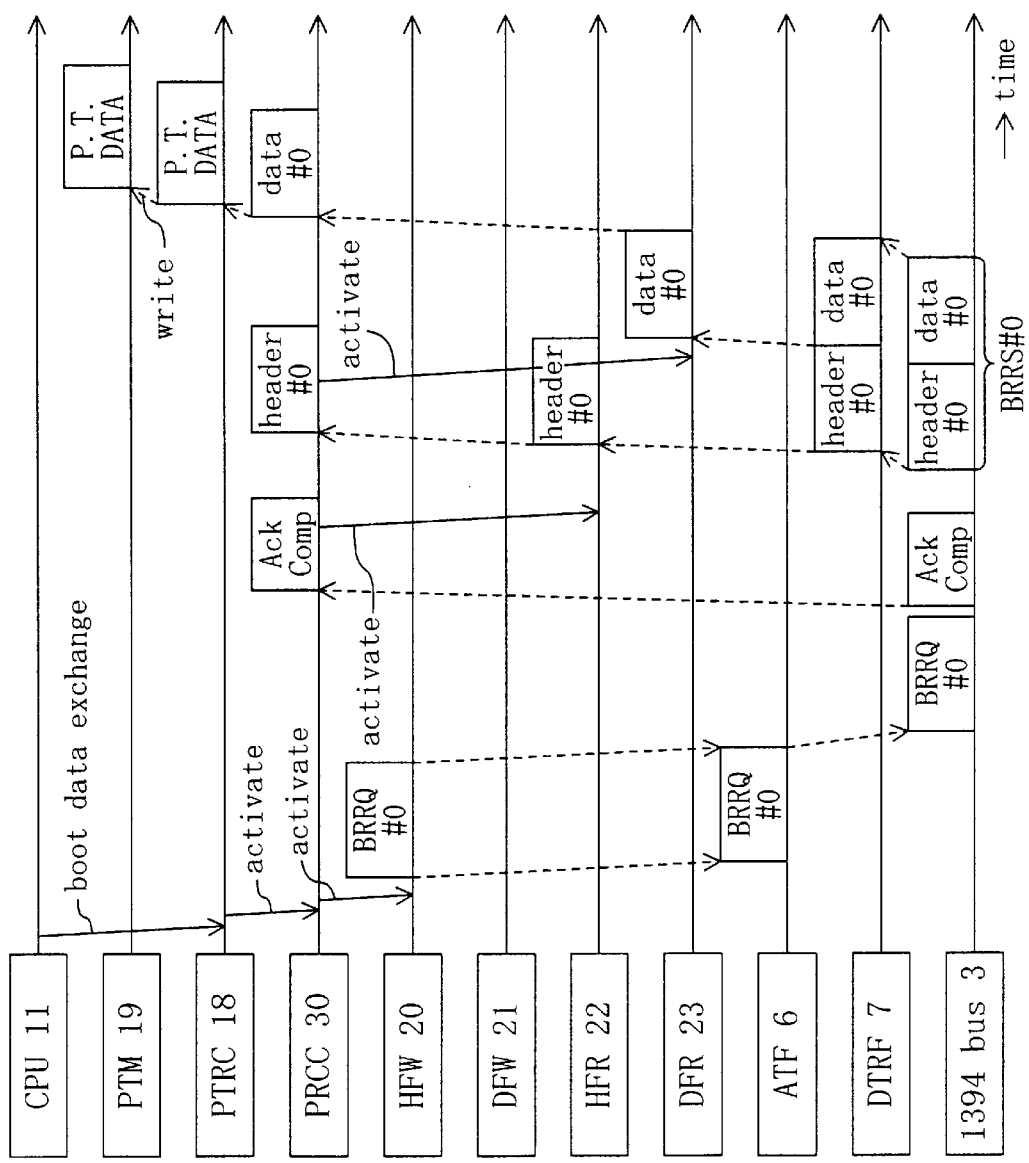
FIGS. 9A and 9B illustrate a timing diagram showing the operations of respective components in FIG. 7.
Figure 9B:
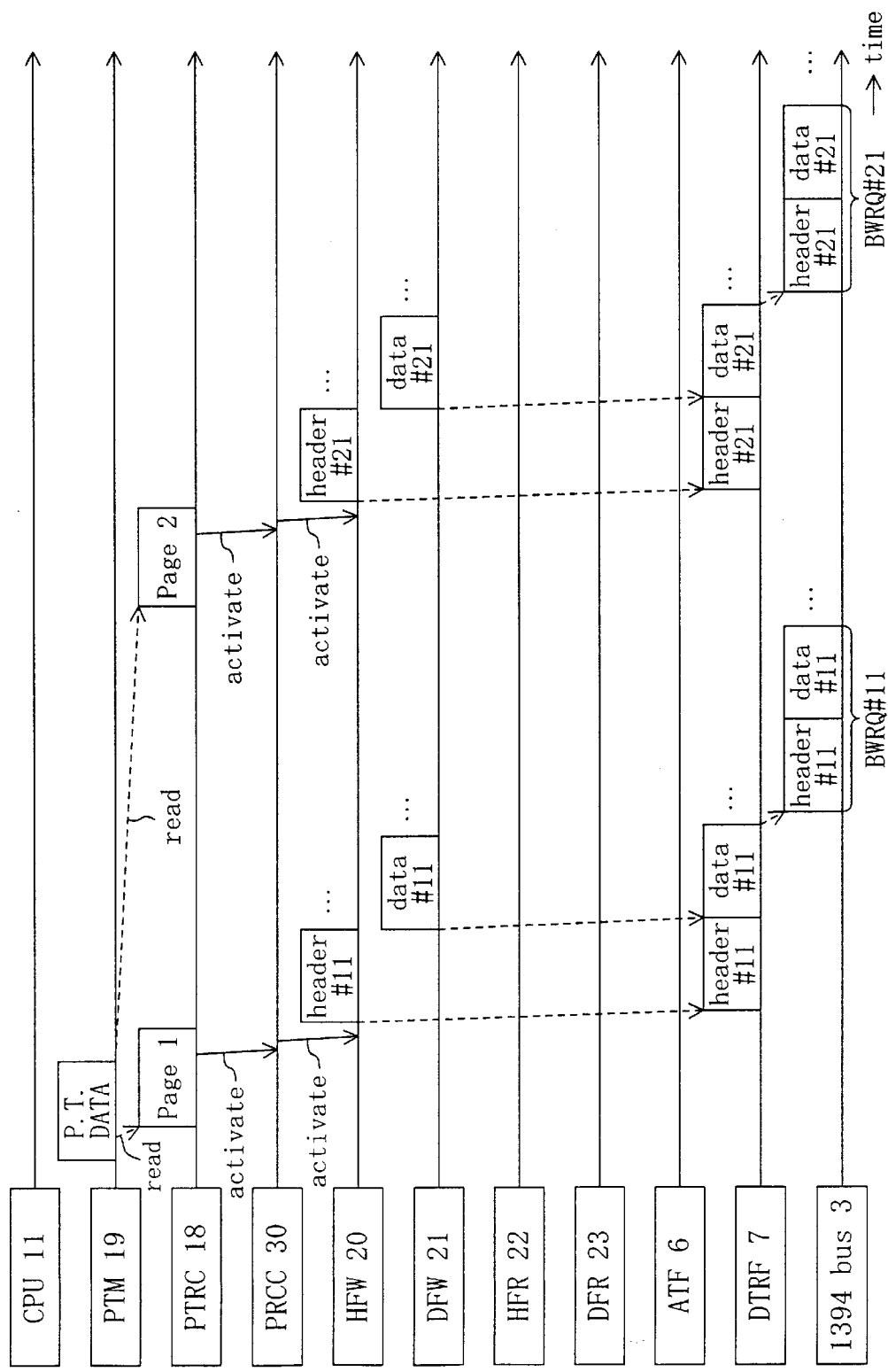

FIGS. 9A and 9B are a timing diagram illustrating a situation where the page table is used in executing a READ command. In the illustrated example, the number n of pages is supposed to be two. It should be noted that the target 2 shown in FIG. 7 can also cope with execution of a WRITE command using the page table.

(1) In accordance with the information represented by the ORB acquired from the initiator 1, the CPU 11 sets the page table address PTA, number n of pages, payload size, tcode and initial value of tl for the PTRC 18 and then activates the PTRC 18.

(2) The PTRC 18 instructs the HFW 20 via the PRCC 30 to make a BRRQ packet #0 requesting the page table data from the initiator 1.

(3) The HFW 20 makes the BRRQ packet #0 and writes the packet on the ATF 6 by way of the TFIL 9. In this manner, the BRRQ packet #0 is send out onto the 1394 bus 3 and transmitted to the initiator 1.

(4) The PRCC 30 waits for the initiator 1 to return an ACK packet and a BRRS packet #0 in response to the BRRQ packet #0.

(5) The BRRS packet #0, which has been received by the target 2, is written on the DTRF 7 by way of the RFIL 8. After the RFIL 8 has identified tcode and tl of the received packet with that of the BRRS packet and that of the BRRQ packet #0, respectively, the PRCC 30 activates the HFR 22 to make the HFR 22 read out header #0 from the DTRF 7. Furthermore, if rcode of the received BRRS packet #0 is resp_complete, the PRCC 30 activates the DFR 23 to make the DFR 23 read out data #0 from the packet. In accordance with the header information that has been read out by the HFR 22, the DFR 23 reads out the data #0 from the DTRF 7 and sends the data to the PRCC 30.

(6) The PTRC 18 receives the data #0, i.e., the page table data, from the PRCC 30 and writes the data on the PTM 19.

(7) The PTRC 18 reads out the information about Page 1, i.e., ADR1 and LENGTH1, from the PTM 19. In accordance with this information, the PTRC 18 instructs the HFW 20 via the PRCC 30 to make a BWRQ packet #11 for transferring the data of Page 1 to the initiator 1.

(8) The HFW 20 and the DFW 21 make a header #11 and data #11, respectively, and then write them on the DTRF 7 by way of the TFIL 9. In this manner, the BWRQ packet #11 is send out onto the 1394 bus 3 and transmitted to the initiator 1. In this case, if LENGTH1 exceeds a payload size, then the data of Page 1 should be divided into plural data blocks and transferred in multiple BWRQ packets. As a result, the data with the length LENGTH1 is stored at a memory location, which begins with ADR1, in the initiator 1.

(9) The PTRC 18 further reads out the information about Page 2, i.e., ADR2 and LENGTH2, from the PTM 19. In accordance with this information, the PTRC 18 instructs the HFW 20 via the PRCC 30 to make a BWRQ packet #21 for transferring the data of Page 2 to the initiator 1.

(10) The HFW 20 and the DFW 21 make a header #21 and data #21, respectively, and then write them on the DTRF 7 by way of the TFIL 9. In this manner, the BWRQ packet #21 is send out onto the 1394 bus 3 and transmitted to the initiator 1. In this case, if LENGTH2 exceeds a payload size, then the data of Page 2 should be divided into plural data blocks and transferred in multiple BWRQ packets. As a result, the data with the length LENGTH2 is stored at a memory location, which begins with ADR2, in the initiator 1.

(11) Thereafter, when the PTRC 18 confirms that all the data requested has been transmitted normally or that the transmission has ended abnormally, the PTRC 18 asserts an interrupt signal, which is represented as "complete" for normal end or "error" for abnormal end. And the PTRC 18 informs the CPU 11 of the completion of transmission processing by sending the interrupt signal thereto.

As is apparent from the foregoing description, not only the ARF 5 and ATF 6 but also the DTRF 7 are provided and selectively used depending on the situation according to the present invention, thereby reducing the overheads involved with firmware processing and exchanging data at higher speeds. In addition, after the PTRC 18 has been activated, data can be exchanged automatically using the page table without the intervention of the CPU 11.

What is claimed is:

1. A data exchange unit for communicating with a counterpart unit through a transmission line using, as a unit, a packet including header and data fields, the exchange unit comprising:

a transmission buffer;

a reception buffer;

a transmission-reception buffer;

a transmission filter for selectively storing a packet to be transmitted on either the transmission buffer or the transmission-reception buffer depending on the contents of the packet to be transmitted;

a reception filter for selectively storing a received packet on either the reception buffer or the transmission-reception buffer depending on the contents of the received packet;

a packet processor for making a packet containing information to be transmitted or fetching necessary information from the received packet;

a transceiver for converting the packet that has been stored on the transmission buffer or the transmission-reception buffer into an electrical signal to be transmitted through the transmission line or converting another electrical signal received through the transmission line into the packet that will be stored on the reception buffer or the transmission-reception buffer; and a central processing unit for activating the packet processor, wherein if a response packet paired with a request packet has been received, then the reception filter stores the response packet received on the transmission-reception buffer and informs the packet processor of response detected, and wherein if any other response packet has been received in response to the request packet, then the reception filter stores the received packet on the reception buffer and issues a suspension instruction to the packet processor.

2. The data exchange unit of claim 1, wherein the packet processor comprises:

a request packet counter for counting the number of request packets provided to the transmission filter;

a response packet counter for counting the number of response packets that have been read out from the transmission-reception buffer; and a suspension controller for instructing to stop making new request packets and to inform the central processing unit of completion of suspension when a count of the response packet counter matches that of the request packet counter in accordance with the suspension instruction.

3. The data exchange unit of claim 2, wherein the packet processor further includes means for accepting a data exchange reboot instruction from the central processing unit after the central processing unit has been informed of the completion of suspension.

4. A data exchange unit for communicating with a counterpart unit through a transmission line using, as a unit, a packet including header and data fields, the exchange unit comprising:

a transmission buffer;

a reception buffer;

a transmission-reception buffer;

a transmission filter for selectively storing a packet to be transmitted on either the transmission buffer or the transmission-reception buffer depending on the contents of the packet to be transmitted;

a reception filter for selectively storing a received packet on either the reception buffer or the transmission-reception buffer depending on the contents of the received packet;

a packet processor for making a packet containing information to be transmitted or fetching necessary information from the received packet;

a transceiver for converting the packet that has been stored on the transmission buffer or the transmission-reception buffer into an electrical signal to be transmitted through the transmission line or converting another electrical signal received through the transmission line into the packet that will be stored on the reception buffer or the transmission-reception buffer;

a page table memory for storing page table data, the page table data being used for indirectly addressing a memory location in the counterpart unit;

a packet transmission controller for controlling the packet processor; and a central processing unit for activating the packet transmission controller, wherein if the central processing unit has received a request for transferring data using a page table by way of the reception buffer and has activated the packet transmission controller, then the packet transmission controller instructs the packet processor to make a request packet for acquiring the page table data from the counterpart unit, and wherein after the packet processor has acquired the page table data by way of the transmission-reception buffer, the packet transmission controller stores the page table data on the page table memory, and then instructs the packet processor to make another request packet requesting an access to a memory location in the counterpart unit that has been specified by the page table data stored on the page table memory.

* * * * *